United States Patent [19]

Ritter et al.

[11] 3,867,178
[45] Feb. 18, 1975

[54] METHOD FOR COATING DISCRETE PARTICLES

[75] Inventors: James R. Ritter, Ridgewood; Otto R. Strauch, Wyckoff, both of N.J.

[73] Assignee: Potters Industries Inc., Carlstadt, N.J.

[22] Filed: Sept. 5, 1972

[21] Appl. No.: 286,059

[52] U.S. Cl............ 117/69, 106/308 N, 117/100 S, 117/124 D, 117/124 F, 117/126 GN, 117/126 GQ, 117/126 GS, 117/109
[51] Int. Cl................................................ B44d 1/14
[58] Field of Search ............ 117/100 S, 126 GS, 73, 117/85, 124 F, 69, 124 D, 126 GN, 126 GQ, 117/109; 106/308 Q, 308 N

[56] References Cited
UNITED STATES PATENTS

| | | | |
|---|---|---|---|
| 2,878,111 | 3/1959 | Daniels | 117/100 B |
| 3,130,070 | 4/1964 | Potters et al. | 117/100 S |
| 3,177,083 | 4/1965 | de Vries | 117/100 S |
| 3,276,853 | 10/1966 | Eakins | 117/124 F |
| 3,558,345 | 1/1971 | Baum et al. | 117/124 F |
| 3,637,520 | 1/1972 | Schweiger | 106/191 |
| 3,649,320 | 3/1972 | Yates | 117/126 GS |

OTHER PUBLICATIONS

"Silane Coupling Agents for Reinforced Thermoplastics," by S. Sterman & J. Marsden, Modern Plastics, July 1966, pp. 133–142.

Primary Examiner—William D. Martin
Assistant Examiner—Dennis C. Konopacki
Attorney, Agent, or Firm—Curtis, Morris & Safford

[57] ABSTRACT

A method for coating glass spheres or other discrete particles in which a silane coupling agent and an anticaking agent are successively applied to the particles as they are continuously advanced along a feed path. After the application of the coupling agent, but prior to the introduction of the anti-caking agent, the mass of particles is agitated and its rate of movement is slowed to increase the depth of the mass. The curing of the coupling agent is initiated by the application of heat prior to the addition of the anti-caking agent, and the curing is continued during and subsequent to the agitation of the particles to provide a uniform multi-layer coating on each particle.

11 Claims, 4 Drawing Figures

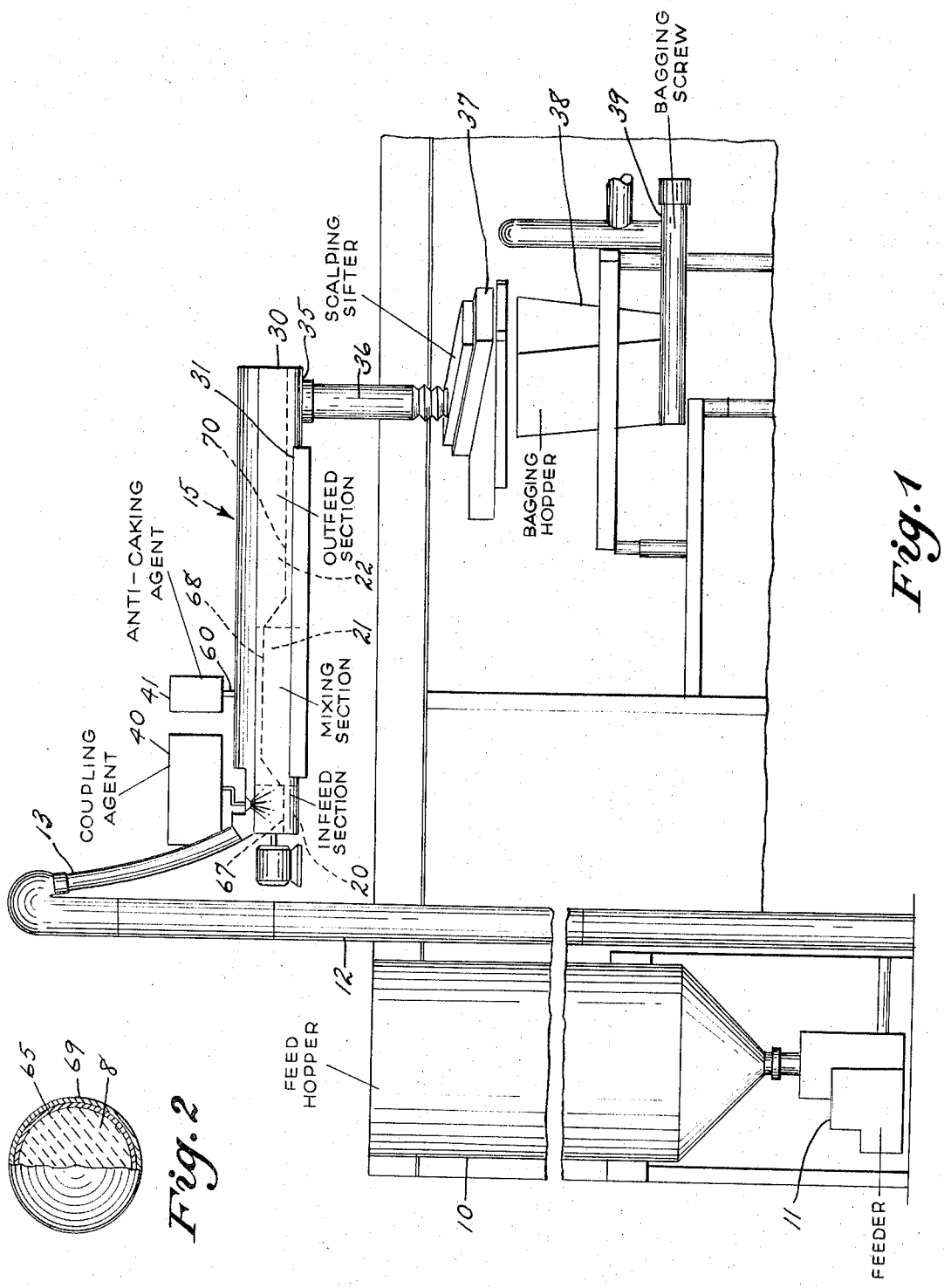

METHOD FOR COATING DISCRETE PARTICLES

BACKGROUND OF THE INVENTION

This invention relates to a method for coating discrete particles and more particularly to a method for coating such particles as they are continuously advanced along a feed path.

In the manufacture of plastics and other resinous materials, it is often desirable to add inorganic particles to the material for various industrial purposes. For articles made from nylon, polyphenylene oxide or other polymers, for example, minute glass spheres, glass fibers and similar inorganic particles may be used as fillers or to provide particular properties for the finished article. Glass spheres also are used with paint and other liquid resins to provide a highly reflective surface.

The inorganic particles employed for such purposes customarily are coated with one of a variety of coupling agents to form an effective bond between each individual particle and the resin. Heretofore, however, difficulties were encountered in the application of the coupling agents and other coatings to the particles on a continuous mass production basis. As an illustration, the techniques previously employed in the coating of glass fibers, for example, often necessitated the addition of lubricants and sizing agents which had an adverse effect on the coupling process. In other situations, particularly in the coating of glass spheres, it was usually necessary to use a time-consuming and expensive batch type process and to allow extended periods for the curing of the coating in order to completely cover each sphere with a coating of the requisite thickness.

An additional difficulty arose because of the tendency of the spheres to settle and cake in low viscosity resins, particularly during storage. The redispersion of the spheres was difficult, time-consuming and entailed an additional expense to the user.

SUMMARY OF THE INVENTION

One general object of this invention, therefore, is to provide a new and improved method for coating glass spheres or other discrete particles.

More specifically, it is an object of this invention to provide such a method for coating the particles on a continuous basis without unnecessary wastage of the coating material and without the need for lubricating or sizing agents.

Another object of the invention is to provide a method for applying a coupling agent to discrete particles of glass or similar inorganic material.

A further object of the invention is to provide a method for applying a thin coupling agent film of carefully controlled thickness to each of a mass of discrete particles being advanced along a feed path.

Still another object of the invention is to provide a method for coating glass spheres which reduces the tendency of the spheres to cake or pack in liquid resin systems.

A still further object of the invention is to provide a novel method for coating discrete particles that is economical and thoroughly reliable in operation.

In one illustrative embodiment of the invention, a mass of discrete particles to be coated is advanced along a feed path, and a silane coupling agent is applied directly to the surfaces of the particles at a predetermined point along the path. The particles are then heated to initiate the curing of the coupling agent, and the particles are agitated and their rate of movement reduced. The curing of the coupling agent is completed by continuing the application of heat during and subsequent to the agitation of the particles, and the particles are discharged from the feed path in a fully coated and cured condition.

In accordance with one feature of several particularly advantageous embodiments of the invention, the mass of discrete particles is continuously advanced along the feed path and is discharged at a uniform rate of between about 1,000 pounds per hour and about 5,000 pounds per hour. The amount of coupling agent applied to the particles is carefully controlled and is maintained just sufficient to insure that each particle is completely coated with a very thin layer. With this arrangement, the chemical loss due to waste and decomposition is maintained at a minimum.

In accordance with another feature of the invention, in certain preferred arrangements, an anti-caking agent is added to the particles at a predetermined point downstream of the point of application of the coupling agent. The anti-caking agent is particularly effective in reducing the tendency of the particles to settle and cake in low viscosity resins.

In accordance with a further feature of some embodiments of the invention, the curing of the coupling agent is initiated prior to the addition of the anti-caking agent but is not completed until the anti-caking agent has been applied. This arrangement insures that the coupling agent is in direct contact with the surfaces of the particles, and yet it permits a degree of interaction between the two coatings to provide a firm bond therebetween.

The present invention, as well as further objects and features thereof, will be understood more clearly and fully from the following description of a preferred embodiment, when read with reference to the accompanying drawings.

BRIEF DESCRIPTION OF THE DRAWINGS

FIG. 1 is a diagrammatic view of apparatus for coating glass spheres or other discrete particles in accordance with the method of an illustrative embodiment of the invention.

FIG. 2 is a greatly enlarged sectional view of a glass sphere coated through the use of the apparatus of FIG. 1.

DESCRIPTION OF A PREFERRED EMBODIMENT

Figure 4:
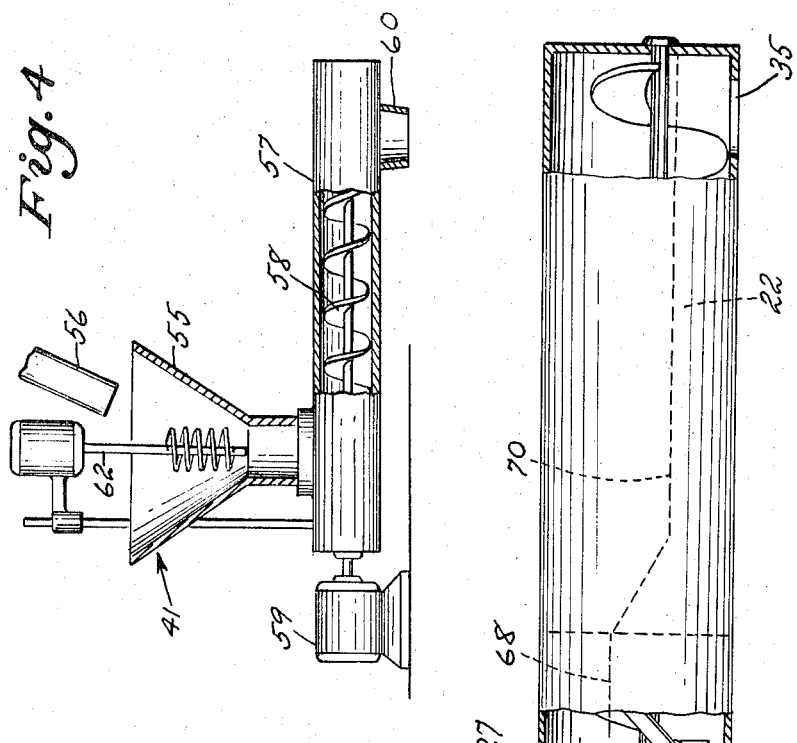
FIG. 4 is a vertical sectional view of a feeding mechanism useful with the apparatus.

Referring to FIG. 1 of the drawings, there is shown a schematic representation of the equipment used to apply successive coatings to glass spheres in accordance with an illustrative embodiment of the invention. A typical coated sphere is depicted at 8 in FIG. 2, although in this latter FIGURE the sphere and its coatings have been shown greatly enlarged for ease of illustration. The spheres coated in accordance with the invention customarily range between 6 and 100 microns in diameter. Depending upon the particular use to which the spheres are to be put, however, the size of the spheres may be outside this range without deleterious effect on the coating procedure.

The spheres to be coated are stored in a feed hopper 10 and are withdrawn at a uniform rate by a feeder 11. The feeder 11 is of conventional construction and serves to continuously advance the spheres to the lower end of an elevator 12. The upper end of the elevator 12 includes a discharge conduit 13. The rate of movement of the spheres from the hopper 10 to the conduit 13 is carefully controlled by the feeder 11 and the elevator 12 such that the spheres are discharged from the conduit at a uniform rate of between about 1,000 pounds per hour and about 5,000 pounds per hour, for purposes that will become more fully apparent hereinafter.

The spheres from the discharge conduit 13 are received by an elongated, horizontally disposed screw conveyor 15. The conveyor 15 illustratively is of the type disclosed in Potters and Wood U.S. Pat. No. 3,130,070 and is arranged to continuously advance the mass of spheres along a feed path defined thereby. As more fully described in the Potters and Wood patent, the conveyor 15 includes an elongated, right-hand screw 17 (FIG. 3) which is carried on a shaft 18 and is driven at a uniform speed by an electric motor 19. The motor rotates the shaft in a direction whereby the spheres are advanced from left to right, as viewed in FIGS. 1 and 3.

The screw conveyor 15 is provided with an infeed section 20, an intermediate, relatively inefficient mixing section 21 and an outfeed section 22 in axial alignment with each other. The section 20 is located in position to receive the spheres from the conduit 13 and is fairly short. The section 21 is somewhat longer, and the section 22 is longer still and approximates the combined length of the sections 20 and 21.

Figure 3:
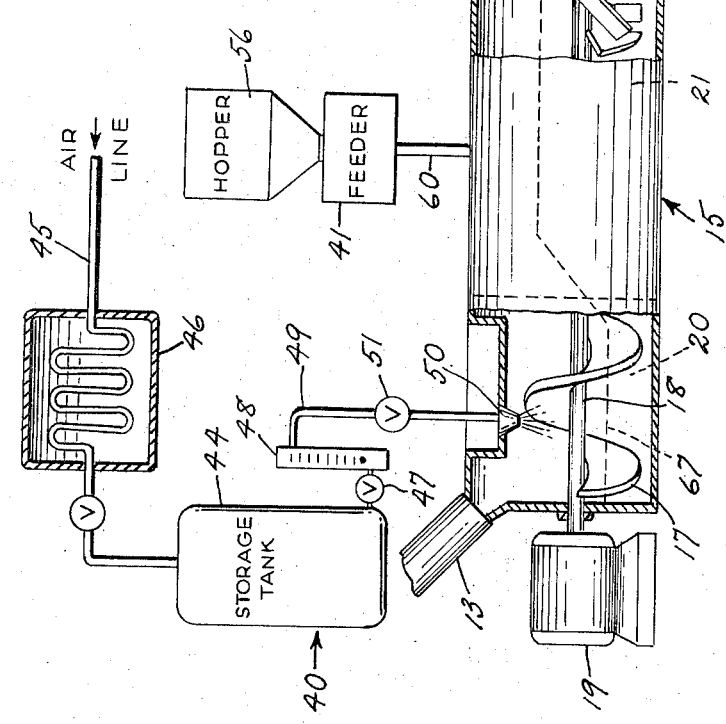
FIG. 3 is a diagrammatic view, with certain portions shown enlarged and in section, of a part of the apparatus of FIG. 1.

As best shown in FIG. 3, the flights of the screw 17 in conveyor sections 20 and 22 are of conventional construction and include the usual smooth, continuous faces. The screw flights in the intermediate section 21, on the other hand, are modified by the provision of a series of mixing bars 25 and rectangular openings 26. The bars 25 are welded or otherwise rigidly secured adjacent the periphery of the flights at 90° intervals in a manner such that one of the bars interconnects the opposed inlet and outlet faces of each flight while another bar joins the opposed faces of each pair of adjacent flights. The openings 26 also are spaced at ninety degree intervals around the periphery of the screw 17 and are positioned midway between the mixing bar ends in contact with each flight. The openings are formed by making four L-shaped cuts in each flight face and by bending the panels resulting from the cuts toward the discharge end of the conveyor to form paddles 27. These paddles meet the flights at approximately right angles.

The screw 17 is arranged to rotate within an elongated trough 30 (FIG. 1). An electrical resistance heating element 31, also of trough-shaped configuration, is externally disposed with respect to the trough 30 and extends from a point immediately downstream of the infeed section 20 and along the mixing section 21 and the major portion of the outfeed section 22.

The conveyor trough 30 includes a discharge opening 35 at the downstream end of the outfeed section 22. The opening 35 communicates with a conduit 36 leading to a scalping sifter 37 of conventional construction. The spheres pass through one or more screens (not shown) within the sifter 37 into a bagging hopper 38. From the hopper 38 the spheres are led to a bagging screw 39 which feeds measured quantities of the spheres into suitable shipping bags or other containers.

As the spheres to be coated move along the feed path defined by the screw conveyor 15, a coupling agent and an anti-caking agent are added to the spheres at successive predetermined points by respective feeders 40 and 41. The coupling agent feeder 40 is located immediately above the infeed section 20 of the conveyor 15 in close proximity to the point at which the spheres are introduced. As best shown in FIG. 3, the feeder 40 includes a coupling agent storage tank 44 which is maintained under pressure by an air line 45. The line 45 is provided with a suitable dryer 46 to maintain the moisture level of the air at a minimum. The material within the tank 44 is introduced into the conveyor 15 through a shut-off valve 47 connected to the lower portion of the tank, a flow meter 48, a line 49 and a spray nozzle 50. A second shut-off valve 51 is located in the line 49 to enable the isolation of the flow meter.

The coupling agent within the storage tank 44 advantageously is in the form of an amino silane. Particularly good results may be achieved through the use of gamma-aminopropyl triethoxy silane, although coupling agents having other primary, secondary and tertiary amino groups may be employed with good effect. Representative amino functional group coupling agents that may be employed include aminoalkyl trimethoxy silane, N(beta-aminoethyl) gamma-aminopropyltrimethoxy silane, triamino alkyl trimethoxy silane, N-bis (beta-hydroxyethyl)-gammaaminopropyltriethoxy silane, gamma-aminopropyl trimethoxy silane, gamma-aminopropyltriethyl acrylic acid adduct silane and gamma-aminopropyltriethoxy silane. These coupling agents are illustrative of a wide variety of commercially available coupling agents with which the invention may be used.

The anti-caking agent feeder 41 is located downstream of the coupling agent feeder 40 above the mixing section 21 of the conveyor 15. In the illustrated embodiment the anti-caking agent is introduced into the conveyor at a point five and one half feet from the point of entry of the spheres from the conduit 13. In other embodiments the point of entry of the anti-caking agent will vary depending upon the operating parameters of the system. In most cases it is important that the curing of the coupling agent be initiated prior to the introduction of the anti-caking agent, and for that reason the forward portion of the heating element 31 is located on the upstream side of the feeder 41.

The feeder 41 comprises a low volume, high accuracy volumetric feeder which introduces the anti-caking material into the conveyor 15 at a rate which illustratively is of the order of 30 pounds per hour. As best illustrated in FIG. 4, the feeder 41 includes a funnel 55 which receives the material from a suitable hopper 56. The lower end of the funnel 55 is connected to a horizontally disposed conduit 57. This conduit accommodates a screw conveyor 58 which is driven by an electric motor 59 to advance the material within the conduit from adjacent the lower end of the funnel 55 to a discharge line 60 leading to the conveyor 15 (FIG. 3). An agitator 62 within the funnel 55 serves to maintain the material in a fluid condition as it moves toward the conduit 57.

The anti-caking agent is fed to the conveyor 15 at a carefully controlled rate. Although the feed rate depends in part on the type of anti-caking agent employed, in several particularly advantageous embodiments the amount by weight of anti-caking agent added to the spheres should be between about ½ and about 1½ percent of the weight of the spheres. If, for example, the spheres are advanced along their feed path at a rate of 3,000 pounds per hour, the anti-caking agent should be introduced at a rate of between about 15 pounds per hour and 45 pounds per hour. In cases in which the amount of anti-caking agent is much below this range, its effectiveness drops off markedly, while an excess of anti-caking agent represents wasted material and can adversely affect the action of the coupling agent.

One particularly advantageous anti-caking agent is the material available commercially from the Kelco Corp., San Diego, Calif., under its trade name SOLOID. This material is an amine salt of a hydrophillic colloid and customarily is used as a thickener for various solvents. Surprisingly, however, it has exhibited particular utility in the formation of anti-caking coatings on glass spheres.

The glass spheres introduced into the conveyor 15 are advanced through the infeed section 20 at a uniform rate. As indicated heretofore, the feed rate for the spheres advantageously is between about 1,000 pounds per hour and about 5,000 pounds per hour. If the rate of feed is substantially below this range, it is difficult to produce a corresponding adjustment in the anti-caking feeder 41, because the anti-caking feed rate then becomes too low to apply the material to the spheres with the necessary accuracy and uniformity. For feed rates much above 5,000 pounds per hour, the coatings on the spheres are subject to incomplete curing within the confines of the conveyor. Particularly good results are achieved in cases in which the rate of feed of the spheres is about 3,000 pounds per hour.

As the spheres reach the conveyor trough 30, they are immediately contacted by the coupling agent from the feeder 40, and a thin uncured film of the coupling agent is applied directly to the exposed surface of each sphere. The rate of feed of the coupling agent is adjusted such that, upon curing, the coupling agent produces a coating 65 (FIG. 2) on each sphere of a comparatively precise thickness. The thickness of this coating preferably is within the range of at least one molecular layer and not more than five molecular layers. If the coating thickness is less than one molecular layer, there is an insufficient bond between the glass and the resin with which the sphere is to be used, while a thickness in excess of five molecular layers similarly prevents a strong glass-resin bond and represents a wastage of the coating material. For best results the thickness of the coating should be maintained at about two molecular layers. A convenient and advantageous procedure for determining the coating thickness is disclosed in James R. Ritter and Otto R. Strauch U.S. patent application Ser. No. 2,286,060 entitled "Method of Analyzing Coatings on Particulate Material" filed concurrently herewith. As pointed out more fully in that application, the particular coupling agent used will depend on the purpose and properties of the material to which the substrate is to be added.

Following the application of the coupling agent, the spheres continue their movement along the feed path into the comparatively inefficient conveyor section 21. The spheres within the infeed section 20 are disposed in the bottom portion of the trough 30 at a level indicated by the dotted line 67. As the spheres reach the section 21, their rate of movement abruptly decreases as a result of the mixing bars 25, the rectangular openings 26 and the paddles 27. The spheres in section 21 thus rise to a level 68 sufficient to completely submerge the feed screw 17. At this time, as well as throughout its passage through the section 21, the mass of spheres beneath the level 68 is undergoing violent agitation, and the coupling agent is uniformly distributed over the surface of each sphere.

Shortly after the mass of spheres enters the mixing section 21, the curing of the coupling agent on each sphere is initiated by the application of heat from the heating element 31. As the spheres continue their movement through the mixing section, the anti-caking agent is added at the predetermined point determined by the location of the feeder conduit 60. In the illustrated embodiment this conduit is disposed at a point approximately 3 feet downstream from the beginning of the mixing section. The curing of the coupling agent is not complete at this point, with the result that an advantageous interaction takes place between the coupling agent and the anti-caking agent. Upon the curing of the anti-caking agent, there is provided a uniform anti-caking coating 69 (FIG. 2) on each sphere around the coupling agent coating 65.

Throughout the passage of the spheres through the mixing section 21, the agitation resulting from the mixing bars 25, the rectangular openings 26 and the paddles 27 prevents any agglomeration of the spheres which might otherwise take place as a result of the coupling and anti-caking agents. In addition, as indicated heretofore, the level 68 of the spheres passing through the mixing section is such that the flights of the screw 17 are completely submerged. As a result, at least a major portion of the agitation takes place beneath the surface of the mass of spheres, thereby substantially reducing chemical loss due to such factors as splashing and evaporation.

As the mass of coated spheres enters the outfeed section 22, the agitation of the spheres drops sharply. The rate of movement of the spheres is increased to reduce their level to that shown by the broken line 70. The curing of the two coatings on each sphere is continued as the spheres advance through the outfeed section, and by the time the spheres reach the discharge opening 35 the curing is completed. In several advantageous embodiments, the curing temperature provided by the heating element 31 is such that the temperature of the spheres as they reach the point of discharge is within the range of from about 60° F. to about 160° F. If the temperature is substantially below 60° F. at the discharge point, the coatings exhibit insufficient curing, while for temperatures above about 160° F. the anti-caking agent on the spheres exhibits a tendency to decompose. Particularly good results are obtained in cases in which the sphere temperature is maintained between about 80° F. and about 100° F. The coated and cured spheres proceed through the conduit 36 and the sifter 37 to the bagging hopper 38 where they are prepared for shipment.

The following examples are set forth in illustration of this invention and should not be construed as a limitation thereof. Unless otherwise indicated, all parts and percentages given are by weight.

EXAMPLE I

An installation was constructed of the type illustrated in FIG. 1. The conveyor 15 employed a 12-inch diameter screw and was supplied with glass spheres at a rate of 3,000 pounds per hour. The spheres were of soda-lime-silica glass and ranged in diameter from 6 to 60 microns.

The coupling agent feeder was located in close proximity to the point of introduction of the spheres. The coupling agent constituted gamma-aminopropyltriethoxy silane and was mixed with the spheres at a rate which produced a coating on each sphere having a thickness of two molecular layers.

The anti-caking agent feeder was disposed at a point five and one-half feet from the point of introduction of the spheres and three feet downstream from the beginning of the mixing section. The anti-caking agent comprised the SOLOID material identified heretofore, and it was introduced into the conveyor at a uniform rate of 30 pounds per hour.

The spheres were advanced along the feed path defined by the conveyor through the infeed section, the mixing section and the outfeed section. In the mixing section the level of the mass of spheres increased to completely cover the feed screw. The sphere level dropped off as the spheres entered the outfeed section. Shortly after the beginning of the mixing section, heat was applied to the spheres to initiate the curing of the coating materials, and the application of heat was continued until the spheres approached the discharge end of the outfeed section. At the point of discharge the coatings on the spheres were completely cured, and the sphere temperature closely approximated 80° F. The thus coated spheres proceeded through the scalping sifter to the bagging hopper.

EXAMPLE II

The procedure of the foregoing example was repeated, except that the amount of heat applied to the spheres was increased to provide a sphere temperature at the point of discharge of 100° F. The coatings on the spheres were again satisfactory and closely approximated the coatings obtained in Example I.

EXAMPLE III

The Example I procedure was repeated at sphere feed rates of 2,000 pounds per hour and 5,000 pounds per hour. Again, good results were achieved.

The terms and expressions which have been employed are used as terms of description and not of limitation, and there is no intention in the use of such terms and expressions of excluding any equivalents of the features shown and described or portions thereof, but it is recognized that various modifications are possible within the scope of the invention claimed.

What is claimed is:

1. A continuous method for coating discrete particles which comprises, in combination:
   continuously advancing a mass of discrete particles to be coated along a feed path;
   applying an amino type coupling agent to the particles at a first predetermined point along the feed path to provide an uncured coating on the surface of each particle;
   initiating the curing of the coupling agent coating by the application of heat thereto as the particles continue their movement along the feed path;
   adding an anti-caking agent to the coated particles at a second predetermined point along the feed path; and
   completing the curing of the coupling agent coating by continuing the application of heat thereto as the particles move along the feed path downstream of said second predetermined point.

2. A method as defined in claim 1, in which the particles are coated with a gamma-aminopropyltriethoxy silane coupling agent.

3. A method as defined in claim 1, which further comprises:
   increasing the depth of the mass of coated particles as they advance along said portion of the feed path.

4. A method as defined in claim 1, in which the particles are advanced along the feed path at a uniform rate of between 1,000 and 5,000 pounds per hour.

5. A method as defined in claim 1, in which the temperature of the particles at said second predetermined point lies within the range of from about 60° F. to about 160° F.

6. A continuous method for coating glass spheres which comprises, in combination:
   continuously advancing a mass of glass spheres to be coated along a feed path;
   applying a silane coupling agent to the spheres at a first predetermined point along the feed path to provide an uncured coating on the surface of each sphere;
   initiating the curing of the coupling agent coating by the application of heat thereto as the spheres continue their movement along the feed path;
   adding an anti-caking agent to the coated spheres at a second predetermined point along the feed path, the anti-caking agent comprising an amine salt of a hydrophillic colloid; and
   completing the curing of the coupling agent coating by continuing the application of heat thereto as the spheres move along the feed path downstream of said second predetermined point.

7. A method as defined in claim 6, in which the coupling agent comprises gamma-aminopropyltriethoxy silane.

8. A continuous method for coating discrete particles which comprises, in combination:
   continuously advancing a mass of discrete particles to be coated along a feed path;
   applying a silane coupling agent to the particles at a first predetermined point along the feed path to provide an uncured coating on the surface of each particle, the thickness of the coupling agent coating on each particle being at least about one molecular layer and not more than about five molecular layers;
   initiating the curing of the coupling agent coating by the application of heat thereto as the particles continue their movement along the feed path;
   adding an anti-caking agent to the coated particles at a second predetermined point along the feed path, the anti-caking agent comprising an amine salt of a hydrophillic colloid;
   completing the curing of the coupling agent coating by continuing the application of heat thereto as the particles move along the feed path downstream of said second predetermined point; and thereafter discharging the coated particles at a subsequent predetermined point along the feed path, the heat applied to the particles as they move along said path producing a particle temperature at the point of discharge which lies within the range of from about 60 F. to about 160 F.

9. A continuous method for coating glass spheres which comprises, in combination:

continuously advancing a mass of glass spheres to be coated along a feed path;

applying a gamma-aminopropyltriethoxy silane coupling agent directly to the surfaces of the spheres at a first predetermined point along the feed path to provide an uncured coating on the surface of each sphere;

initiating the curing of the coupling agent coating by the application of heat thereto as the spheres continue their movement along the feed path;

increasing the depth of the mass of coated spheres as they advance along a portion of the feed path;

agitating the mass of coated spheres as it moves along said path portion at said increased depth;

adding an anti-caking agent to the coated spheres at a second predetermined point along the feed path, the anti-caking agent comprising an amine salt of a hydrophillic colloid;

continuing the agitation of the mass of coated spheres during the addition of the anti-caking agent to provide a uniform anti-caking coating on each sphere around the coupling agent coating; and completing the curing of the coupling agent coating by continuing the application of heat thereto as the spheres move along the feed path downstream of said second predetermined point.

10. A method as defined in claim 9, in which the amount by weight of anti-caking agent added to the spheres is between about ½ and about 1½ percent of the weight of the spheres.

11. A continuous method for coating discrete particles which comprises, in combination:

continuously advancing a mass of discrete particles to be coated along a feed path at a rate of between one thousand and five thousand pounds per hour;

applying a silane coupling agent directly to the surfaces of the particles at a first predetermined point along the feed path to provide an uncured coating on the surface of each particle, the thickness of the coupling agent on each particle being at least one molecular layer and not more than five molecular layers;

initiating the curing of the coupling agent coating by the application of heat thereto as the particles continue their movement along the feed path;

increasing the depth of the mass of coated particles as they advance along a portion of the feed path;

agitating the particle mass as the coated particles move along said path portion at said increased depth;

adding an anti-caking agent to the coated particles at a second predetermined point along the feed path, the anti-caking agent comprising an amine salt of a hydrophillic colloid;

continuing the agitation of coated the mass of particles during the addition of the anti-caking agent to provide a uniform anti-caking coating on each particle around the coupling agent coating;

completing the curing of the coupling agent coating by continuing the application of heat thereto as the particles move along the feed path downstream of said second predetermined point; and thereafter discharging the coated particles at a subsequent predetermined point along the feed path, the heat applied to the particles as they move along said path producing a particle temperature at the point of discharge which lies within the range of from about 60° F. to about 160° F.

* * * * *